United States Patent Office 3,474,335
Patented Oct. 21, 1969

3,474,335
TRANSFER RATIO ARM BRIDGE HAVING CORRECTION FOR LEAD IMPEDANCES EMPLOYING DIFFERENTIAL AMPLIFIER SUPPLYING CORRECTIVE VOLTAGES
Raymond Calvert and John Mildwater, Chessington, England, assignors to The Wayne Kerr Company Limited, Chessington, Surrey, England, a British company
Filed June 14, 1967, Ser. No. 646,103
Claims priority, application Great Britain, June 17, 1966, 27,259/66
Int. Cl. G01r 27/00
U.S. Cl. 324—57                                6 Claims

ABSTRACT OF THE DISCLOSURE

In an electrical bridge, particularly a transformer ratio arm bridge, of the kind in which voltages in known ratio are applied to an unknown and a standard impedance and the resultant currents compared, the present invention provides correction for lead impedances and, in the case of a transformer ratio arm bridge, for the leakage impedance of the transformer windings. For this purpose, the difference between the voltage across the unknown and the voltage which is to be applied to the unknown is fed to the input of an amplifier to give an output which is used as a correcting voltage applied in series with the unknown or as a compensating voltage applied to the standard impedance to compensate for the difference between the actual and desired voltage across the unknown.

---

This invention relates to electrical bridges of the kind in which voltages in known ratio are applied to an unknown and a standard impedance and the resultant currents compared, and has for its principal object the reduction or elimination of certain errors which can arise in such bridges.

The invention finds particular application in transformer ratio arm bridges because, using a transformer with closely coupled windings, it is readily possible to produce alternating voltages in known ratio to a very high degree of accuracy. Similarly, in comparing the resultant currents, using a transformer feeding a null detector, it is readily possible to determine to a very high degree of accuracy when two alternating currents are in a known amplitude ratio. To utilize fully the possible accuracy of such bridges, consideration has to be given to sources of errors which might otherwise be regarded as insignificant.

If measurement is made of a high admittance, i.e. a low impedance, the impedance of the connecting leads to the unknown impedance and of the associated wiring in the instrument may be of significance. In a transformer ratio arm bridge, the leakage impedance of the transformer windings may also be of significance when measuring a high admittance.

According to this invention, in an electrical bridge of the kind in which voltages in known ratio are applied to an unknown and a standard impedance and the resultant currents compared, the difference between the voltage across the unknown impedance and the voltage to be applied to the unknown is applied to the input of an amplifier to give an output which is used as a correcting voltage applied in series with the unknown impedance or as a compensating voltage applied to the standard impedance to compensate for the difference between the actual and desired voltage across the unknown.

In this arrangement, the actual voltage across the unknown is, in effect, compared with the voltage which it is desired to apply to the unknown so as to obtain an error signal used to provide, via the amplifier, the correcting or compensating voltage. The correction or compensation takes care of all the lead impedances in the circuit for the unknown outside the points from which the voltage across the unknown is taken. This voltage may be taken from the immediate terminals of the unknown so that the effect of all lead impedances is eliminated.

In a transformer ratio arm bridge having an input transformer with closely coupled secondary windings providing alternating voltages in known ratio which are applied to an unknown and a standard impedance and means for comparing the resultant currents through these impedances, there may be provided a further winding on said input transformer giving an output voltage equal to that which it is desired to apply to the unknown, means connecting said further winding in series opposition with the voltage across the unknown to give an error voltage which is applied to the input of an amplifier and means feeding the amplifier output as a correcting voltage applied in series with the unknown impedance or as a compensating voltage applied to the standard impedance to compensate for the difference between the actual and desired voltage across the unknown. A correcting voltage in series with the voltage applied to the unknown is algebraically added to correct the current through the unknown and the system is thus inherently self-regulating. The amplifier gain in this case is preferably as high as convenient. As is explained lated, in some cases, it may be preferred to effect the compensation on the standard side of the bridge by bringing the current through the standard to the correct ratio with that through the unknown and, in this case, the compensating voltage must be appropriately related to the difference between the actual and desired voltage across the unknown.

Usually it is most convenient to feed the difference voltage into a high gain amplifier, the output of which, conveniently through a transformer, is connected in series with the unknown so as to increase the voltage applied thereto; such a system is inherently self-regulating, the output voltage from the amplifier increasing the voltage across the unknown and so reducing the difference voltage. If the amplifier gain is high enough, the difference voltage becomes almost negligible. It will be seen that this arrangement ensures that the voltage across the unknown is made closely equal to the voltage across the further winding of the transformer; the amplifier requires negligible current and hence the leakage impedance of this further winding and of the connections to the amplifier are immaterial. Thus compensation is obtained for any errors in the voltage across the unknown however they may arise, e.g. due to impedance of the leads and circuits in the bridge, the leakage impedance of the winding feeding the unknown and, if an output current transformer feeding a detector is employed, any leakage impedance of the winding on the output transformer through which the current from the unknown passes.

In a transformer ratio arm bridge, the leakage inductance of the primary winding of the input voltage transformer is immaterial. On the standard side of the bridge, the standard impedance can readily be arranged to have an impedance high compared with the lead impedances and winding leakage impedance and thus compensation or correction in the manner described above, although possibly, is unnecessary in practice.

Difficulties may arise if the unknown impedance is capacitive since feedback stability for a high gain amplifier having an inductive output impedance may not be satisfactory achieveable when feeding a capacitive load. In this case, instead of using a high gain amplifier, a unity gain amplifier (e.g. a cathode follower or emitter follower) may be employed to give an output voltage corresponding to the error voltage and this is applied to the standard side of the bridge, a transformer being employed to increase the voltage in the ratio of the voltage applied to the standard side of the bridge to the voltage applied to the unknown. Balancing of the bridge is conveniently carried out by adjustment of the total voltage applied to the standard e.g. by using an adjustably tapped inductive potential divider connected across the total voltage, i.e. the input winding plus the error correction winding. Alternatively balancing can be carried out by adjusting a tap on the output current transformer.

Further features of the invention will be apparent from the following description, reference being made to the accompanying drawings in which.

Figure 1:
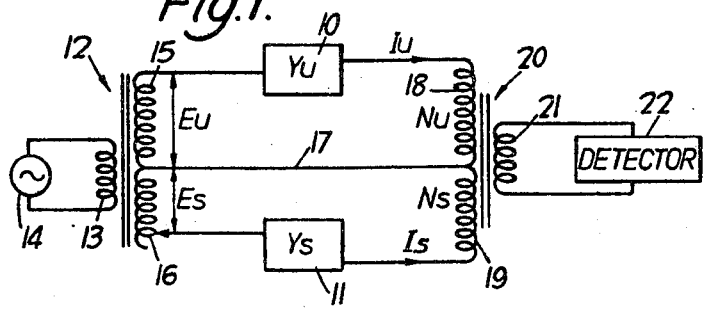
FIGURE 1 is a simplified circuit diagram showing a known type of transformer ratio arm bridge for measuring admittance.

Referring to FIGURE 1, there is shown a conventional transformer ratio arm bridge for measuring the admittance $Y_u$ of an unknown 10 in terms of the admittance $Y_s$ of a standard impedance 11. The bridge is shown in simplified form as comprising an input voltage transformer 12 having a primary winding 13 fed from an alternating current source 14 and having two closely coupled secondary windings 15 and 16 which are connected together. The connection between the windings 15, 16 is connected by a lead 17, referred to hereinafter as the neutral line, to the junction of two windings 18, 19 of an output current transformer 20 having a secondary winding 21 feeding a null balance detector 22.

The winding 15 produces a voltage $E_u$ which is applied to the unknown 10 to give a current $I_u$ fed into the winding 18. The winding 16 produces a voltage $E_s$ which is applied to the standard impedance 11 to give a current $I_s$ fed into the winding 19 in a sense to oppose the flux produced by the winding 18. The bridge is balanced by adjusting the voltage $E_s$ using an adjustable tap on the winding 16.

It will be understood that, for clarity in explaining the present invention, the bridge is shown in a simplified form. In practice, for example the voltage $E_s$ would typically be adjusted by a multi-stage decade potential divider which might be operated automatically by the output of the detector and the windings on the unknown side of the bridge would be adjustably tapped for altering the ranges of measurement.

It will be seen that:

$$E_u Y_u = I_u \quad (1)$$

$$E_s Y_s = I_s \quad (2)$$

At balance, there is no output from the current transformer 20 and, if the windings 18, 19 have $n_u$ and $n_s$ turns respectively then, $$I_u n_u = I_s n_s \quad (3)$$

Therefore $$Y_u = Y_s \frac{E_s}{E_u} \frac{n_s}{n_u} \quad (4)$$

Thus, if $E_s$ is adjustable for balance, $Y_u$ is given directly in terms of the ratio of $E_s$ and $E_u$, for a given current transformer ratio.

Such a bridge may be used for measuring very high admittances as it is readily possible to make the ratio of $E_s$ to $E_u$ accurate to a very high degree, even when $E_s$ is many order of magnetude greater than $E_u$. As previously explained in this case, one has to consider the errors produced by (a) the leakage impedance of the transformers, (b) the internal wiring and switch impedances inside the bridge, and (c) the external impedance of the leads connecting the bridge to the admittance to be measured. The leakage impedance of the voltage transformer 12 is the impedance measured looking back into the winding 15, which produces $E_u$, when the winding 16 is short circuited. This impedance appears directly in series with the unknown. The leakage impedance to the primary is relatively unimportant as the expression in Equation 4 above contains only the ratio of $E_u$ to $E_s$; the absolute value of either is unimportant. The leakage impedance of the winding 16 can also be ignored in practice since the standard impedance 11 is always chosen to be of a much greater magnitude than the leakage impedance which can therefore be ignored. The current transformer 20 has a similar leakage impedance which can be considered to be in series with the unknown. The lead impedances also obviously are in series with the unknown.

Figure 2:
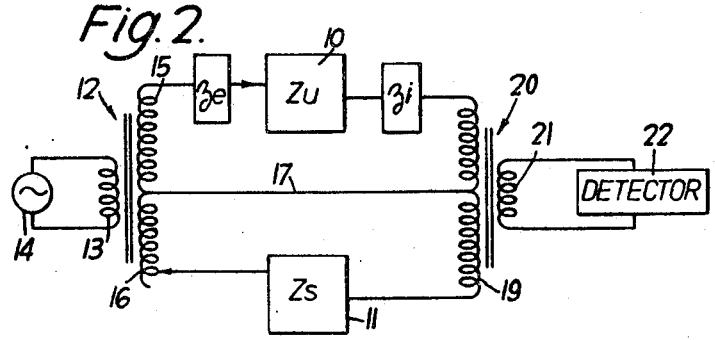
FIGURE 2 is an explanatory circuit diagram for explaining how certain errors arise with high accuracy measurements of high admittance using the bridge of FIGURE 1.

These impedances producing errors can thus be considered as lumped impedances $z_e$ and $z_i$ as shown in FIGURE 2, these two impedances being respectively on the voltage and current sides of the unknown 10. In considering FIGURE 2 it is mathematically more convenient to refer to the impedance $Z_u$ of the unknown 10, this being the reciprocal of $Y_u$ and to the impedance $Z_s$ of the standard 11, which is the reciprocal of $Y_s$.

It will be seen that the voltage applied to the unknown 10 is $$\left[\frac{Z_u}{Z_u + Z_e + Z_i}\right] E_u \quad (5)$$

If the bridge is balanced as before by adjusting $E_s$, the value of $$\frac{E_s}{E_u} \frac{n_s}{n_u} \frac{1}{Z_s}$$

which will be assumed to give the value for $Y_u$ is in error by a factor $$\left[1 + \frac{z_e + z_i}{z_u}\right] \quad (6)$$

This error is brought about by the fact that the voltage applied to the unknown is not $E_u$, as is assumed in Equation 4, but is less than this due to a drop access $z_e$ and $z_i$.

Figure 3:
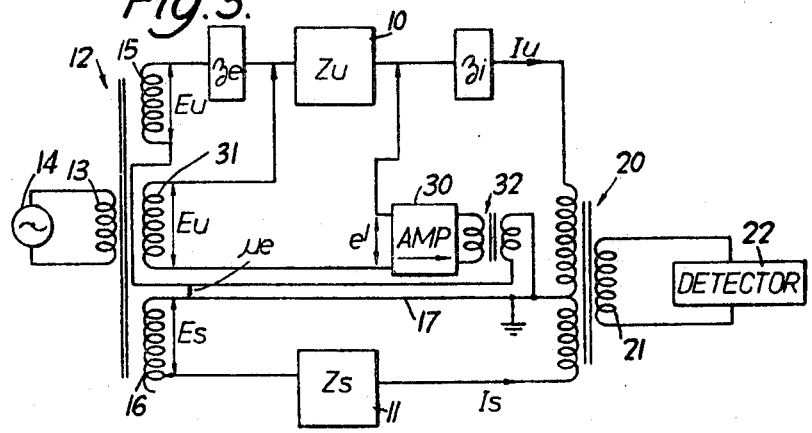
FIGURE 3 is a circuit diagram illustrating one embodiment of the invention.

Referring now to FIGURE 3, there is shown a bridge embodying the invention. In this figure, the same references are used as in FIGURES 1 and 2 to indicate corresponding components and mention will be made only of the distinctive features of FIGURE 3. The voltage across the unknown 10 is applied to the input of a high gain amplifier 30 in series opposition however with the voltage from a winding 31 on the input transformer 12. This winding 31 has the same number of turns as the winding 15 and is closely coupled thereto. The voltage developed across this winding 31 is therefore $E_u$. The amplifier 30 has a high impedance input and hence draws negligible current. The leakage impedance of the winding 31 and the impedance of the leads to the amplifier can therefore be ignored. The input of the amplifier 30 is thus the error voltage which is the difference between the voltage $E_u$ from the winding 31 and the actual voltage across the unknown. It will readily be seen from (5) above that $$e = \left[\frac{z_e + z_i}{Z_u + Z_e + Z_i}\right] E_u \quad (7)$$

The amplifier 30 is assumed to have a gain $\mu$ and the output voltage is applied, via a transformer 32 in series with the voltage $E_u$ on winding 15. This provides a feedback circuit which increases the voltage applied to the unknown above that given by (5) above, so reducing the error voltage. The net input to the amplifier becomes $e'$ and the output applied in series with $E_u$ is $\mu e'$. It will be seen that Also
$$L_u Z_u = E_u - e' \quad (8)$$

$$I_u(Z_u + z_e + z_i) = E_u + \mu e' - e' \quad (9)$$

Equating $I_u$ in both equations.

$$\frac{E_u - e'}{Z_u} = \frac{E_u + \mu e' - e'}{Z_u + z_e + z_i}$$

$$E_u - e' = \left[ \frac{E_u + \mu e' - e'}{1 + \frac{z_e + z_i}{Z_u}} \right]$$

giving $(E_u - e')(z_e + z_i) = Z_u \mu e'$
and so $$e' = \left[ \frac{z_e + z_i}{z_u + z_e + z_i} \right] E_u \quad (10)$$

Comparing this with (6) above, and assuming that the errors originally are not gross and that $z_u \gg (z_e + z_i)$, then $$e = \left[ \frac{z_e + z_i}{Z_u} \right] E_u \quad (11)$$

and $$e' = \left[ \frac{z_e + z_i}{\mu Z_u} \right] E_u \quad (12)$$

showing a reduction in the error by a factor $\mu$, the voltage gain of the amplifier 30. It will be seen that, as $(z_e + z_i)$ approaches $Z_u$, the improvement is reduced but with a high gain amplifier is still extremely useful. For example, errors due to series impedance of the order of 1% are reduced to 40 parts per million using an amplifier with a gain of 250 which is readily realisable.

Difficulties may arise with the arrangement of FIGURE 3 when the unknown 10 is capacitive. The difficulty arises in achieving a high gain amplifier feeding a capacitive load from an inductive output impedance since feedback stability may not be satisfactorily achieved for very high gain.

Figure 5:
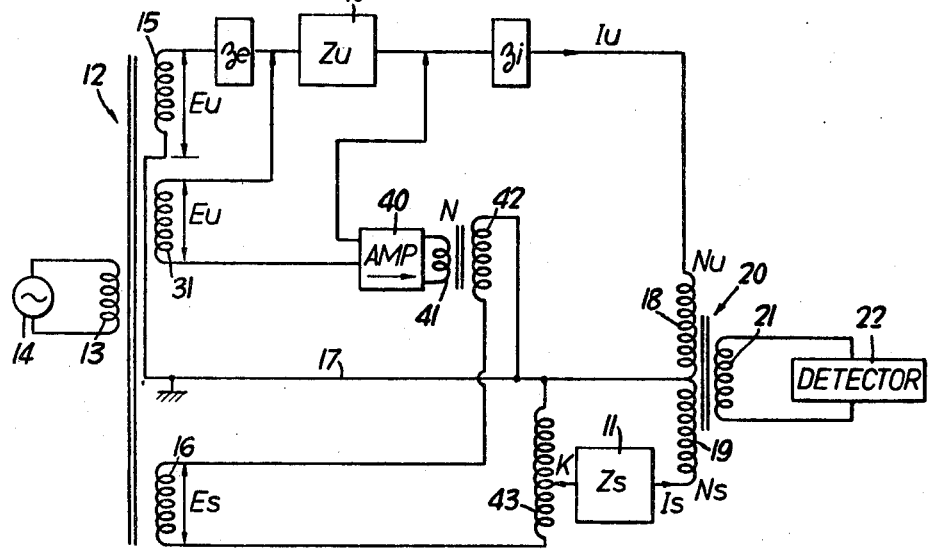
FIGURES 5 and 6 are circuit diagrams illustrating further embodiments of the invention.
Figure 6:
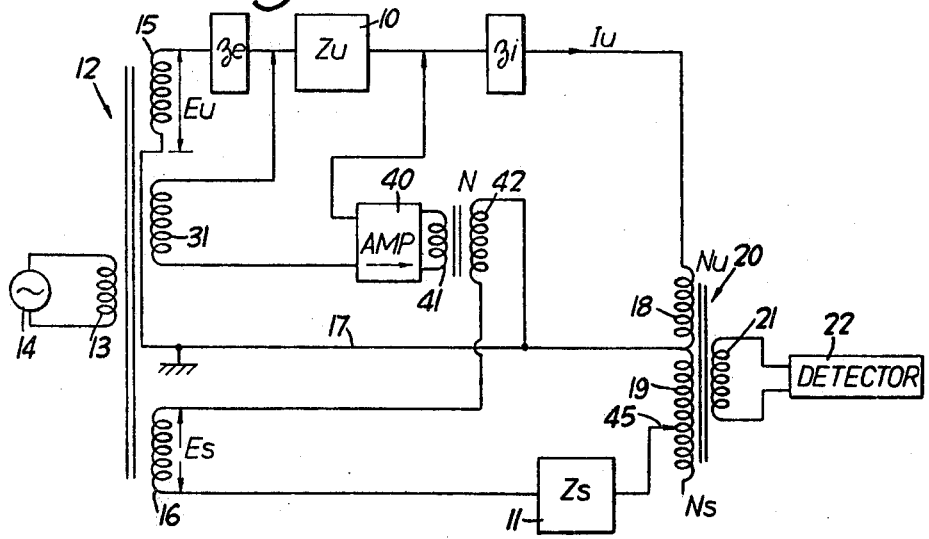

The error voltage $e$ is available however as in the construction of FIGURE 3 and it may be utilised, as shown in FIGURES 5 and 6, but applying it to the standard side of the bridge. This now is not a direct feedback arrangement but is an error correction circuit and hence does not suffer the stability shortcomings of the arrangement of FIGURE 3.

Figure 4:
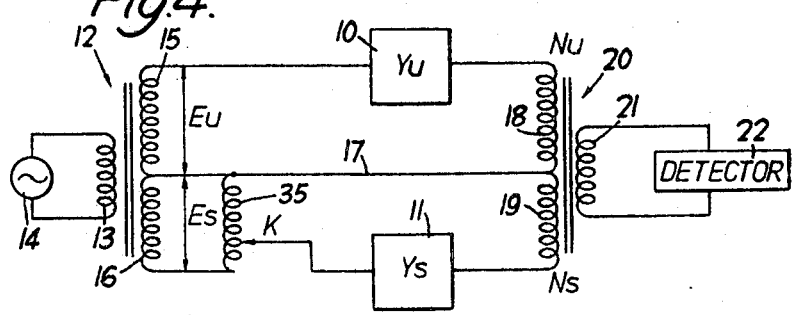
FIGURE 4 is an explanatory diagram illustrating certain known modifications of the bridge of FIGURE 1.

Before describing FIGURES 5 and 6 however, reference will be made to FIGURE 4 which shows a known arrangement for effecting the balancing of a transformer ratio arm bridge. In this figure, the same reference characters are used as in FIGURE 1 and mention will only be made of the distinctive features. In FIGURE 4, the voltage applied to the unknown is adjusted by means of an inductive potential divider 35 connected across the winding 16. A fraction of the voltage $E_s$ across the winding 16 is applied to the standard impedance 11.

Thus $$Y_u = K \frac{E_s}{E_u} \cdot \frac{n_s}{n_u} \cdot Y_s \quad (13)$$

and $Y_u$ can be read directly in terms of K.

Referring now to FIGURE 5, the same reference characters are used as in FIGURES 3 and 4. In FIGURE 5, however, the amplifier to which the error voltage $e$ is applied is a nominally unity gain amplifier 40, conveniently a cathode follower or emitter follower. It will be assumed to have a gain $(1-\alpha)$ which is slightly less than unity. The amount $\alpha$ by which the gain differs from units will be further considered later. The error voltage $e$ is applied to the amplifier 40 which thus gives an output $(1-\alpha)e$. This is applied to a transformer 41 having a turns ratio N where $$N = \frac{E_s}{E_u}$$

This voltage from the secondary winding 42 of the transformer 41 is applied, in series with the voltage $E_s$ on winding 16, across a potential divider 43 which is adjustably tapped at 44 so that a fraction K is applied to the standard impedance 11. The polarity of the output of the transformer 41 is arranged so that the voltage $E_s$ applied to the divider 43 is reduced and hence the voltage applied to the standard impedance 11 is $$K[E_s - N(1-\alpha)e]$$

Thus $$I_s = K \left[ \frac{E_s - N(1-\alpha)e}{Z_s} \right]$$

and $$I_u = \left[ \frac{E_u}{Z_u + z_e + z_i} \right]$$

From (7) above $$e = \left[ \frac{z_e + z_i}{Z_u + z_e + z_i} \right] E_u$$

Thus $$I_s = \frac{K}{Z_s} \left[ E_s - \frac{E_s}{E_u} (1-\alpha) \left( \frac{z_e + z_i}{Z_u + z_e + z_i} \right) E_u \right]$$

$$= \frac{KE_s}{Z_s} \left[ 1 - (1-\alpha) \left( \frac{z_e + z_i}{z_u + z_e + z_i} \right) \right]$$

But, at balance, $I_s n_s = I_u n_u$
therefore $$\frac{KE_s n_s}{Z_s} \left[ 1 - (1-\alpha) \left( \frac{z_e + z_i}{Z_u + z_e + z_i} \right) \right] = \frac{n_u E_u}{Z_u + z_e + z^i}$$

i.e.

$$\frac{KE_s n_s}{n_u E_u Z_s} [Z_u + \alpha(Z_e + Z_i)] = 1$$

Translating back to admittance $$Y_u = \frac{KE_s n_s}{E_u n_u} \left[ 1 + \alpha \frac{(z_e + z_i)}{Z_u} \right] Y_s \quad (14)$$

whereas, without correction, the admittance $Y_u$ was from (6) above in error by the factor $$\left[ 1 + \frac{z_e + z_i}{Z_u} \right]$$

Thus the error is now multiplied by the factor $\alpha$, which is the amount the gain of the amplifier 40 differs from unity. With an appropriately high internal loop gain, this can be made as low as required, typically say 0.001. Thus the error originally present would be reduced to one thousandth of its original value.

As is shown in FIGURE 6, the factor K in the arrangement of FIGURE 5 may be introduced not only by a potential divider as shown in FIGURE 5 but alternatively by tapping the current transformer as shown in FIGURE 6. In FIGURE 6, the same reference numerals are used as in FIGURE 5 to denote corresponding components. The inductive potential divider 43 is omitted so that the compensated output voltage, i.e. the voltage $E_s$ less than output voltage on winding 42, is applied directly to the standard impedance 11. This standard impedance is connected to an adjustable tap 45 on the winding 19 of the transformer 20. If the tap 45 is set to give a fraction K of the total number of turns $n_s$ of the winding 19, $Y_u$ is given by the same expression (14) as is set forth above for the arrangement of FIGURE 5.

The amplifier 30 of FIGURE 3 and the amplifier 40 of FIGURES 5 and 6 would generally be differential input amplifiers as neither of the input terminals would be at ground potential. In FIGURE 3, the amplifier 30 has as high a gain as possible. In FIGURES 5 and 6, unity gain is required; one of the differential inputs may be taken via a feedback winding on the transformer 41 so that the transformer magnetising current is included inside the loop, thereby providing a better approximation to unity gain.

It will be noted that the amplifier in each of FIGURES 3, 5 and 6 has an output transformer. This is not essential but it is convenient to employ such a transformer so that the alternating signal output of the amplifier is isolated from any earth connection via the amplifier input.

We claim:

1. In a transformer ratio arm bridge having an input transformer with a primary winding and first and second closely coupled secondary windings, an alternating current source feeding said primary winding, an unknown impedance connected in series with said first secondary winding to have an alternating voltage applied therefrom and a standard impedance connected in series with said second secondary winding to have an alternating voltage applied therefrom and means for comparing the resultant currents through said impedances; the combination of a further secondary winding on said input transformer having a number of turns such as to give an output voltage equal to that which it is desired to apply to said unknown impedance, an amplifier having an input and an output, means connecting said further winding in series with the input of the amplifier and leads connecting the serially connected amplifier input and windings across the terminals of said unknown impedance, the further winding being connected so that the voltage across the further winding is in opposition to the voltage across the unknown impedance whereby an error voltage is applied to said amplifier input and circuit means connecting the amplifier output in series with one of said first and second secondary windings.

2. A transformer ratio arm bridge as claimed in claim 1 wherein said amplifier is a high gain amplifier and wherein there is provided an output transformer for said amplifier having a primary winding and a secondary winding, means applying the amplifier output to said primary winding of said output transformer, and means connecting said secondary winding of the output transformer in series with the unknown impedance.

3. A transformer ratio arm bridge as claimed in claim 1 wherein said amplifier is a unity gain amplifier and wherein there is provided an output transformer for said amplifier having a primary winding coupled to the output of the amplifier and a secondary winding with the secondary to primary turns ratio equal to the turns ratio of second to the first secondary windings on said input transformer, and means connecting said secondary winding of said output transformer in series with said second secondary winding of said input transformer to correct the voltage applied to said standard impedance.

4. A transformer ratio arm bridge as claimed in claim 3 wherein a potential divider having an adjustable tap is provided, said second secondary winding on the input transformer and said secondary winding on the output transformer being connected in series opposition across said potential divider and the adjustable tap being connected to apply the voltage to said standard impedance.

5. A transformer ratio arm bridge as claimed in claim 4 wherein said potential divider is an inductive potential divider.

6. A transformer ratio arm bridge as claimed in claim 3 wherein said means for comparing the resultant current through the two impedances comprises an output current transformer having a primary winding with an adjustable tap and a secondary winding, and a null balance indicator connected to said secondary winding and wherein said standard impedance is connected to said adjustable tap.

References Cited

UNITED STATES PATENTS 3,363,173   1/1968   Mildwater.

EDWARD E. KUBASIEWICZ, Primary Examiner

J. M. HANLEY, Assistant Examiner